(12) United States Patent
Spanos et al.

(10) Patent No.: US 8,978,262 B2
(45) Date of Patent: Mar. 17, 2015

(54) INLET GUIDE VANE ALIGNMENT APPARATUS AND METHOD

(71) Applicant: General Electric Company, Schenectady, NY (US)

(72) Inventors: Charles Vaughan Spanos, Mauldin, SC (US); Jason Matthew Clark, Loveland, OH (US); John William Herbold, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 219 days.

(21) Appl. No.: 13/689,269

(22) Filed: Nov. 29, 2012

(65) Prior Publication Data

US 2014/0144034 A1    May 29, 2014

(51) Int. Cl.
| | | |
|---|---|---|
| *G01D 21/00* | (2006.01) | |
| *G01B 5/14* | (2006.01) | |
| *F01D 25/28* | (2006.01) | |
| *G01B 1/00* | (2006.01) | |
| *G01B 3/00* | (2006.01) | |
| *G01B 5/00* | (2006.01) | |

(52) U.S. Cl.
CPC ............... *G01B 5/14* (2013.01); *F01D 25/285* (2013.01); *F05D 2230/644* (2013.01)

USPC ................. 33/645; 33/530; 33/542; 33/544.4

(58) Field of Classification Search
USPC .................. 33/645, 530, 542, 544.4
See application file for complete search history.

(56) References Cited

U.S. PATENT DOCUMENTS

| | | | |
|---|---|---|---|
| 6,749,383 B1 * | 6/2004 | Benedict et al. ............. | 410/153 |
| 8,033,785 B2 | 10/2011 | Thermos et al. | |
| 2010/0236044 A1 * | 9/2010 | Bearman ......................... | 29/428 |

* cited by examiner

*Primary Examiner* — Peter Macchiarolo
*Assistant Examiner* — Rhyan C Lange
(74) *Attorney, Agent, or Firm* — Hoffman Warnick LLC; Ernest G. Cusick

(57) ABSTRACT

Various embodiments include alignment apparatuses and associated methods for use on a turbine (e.g., a gas turbine). In various particular embodiments, an apparatus for aligning an unfixed inlet guide vane (IGV) adjacent a fixed IGV in a gas turbine. In some cases the apparatus includes: a first wedge member for interfacing with the fixed IGV; a second wedge member movably coupled with the first wedge member, the second wedge member for interfacing with the unfixed IGV; and an adjustment apparatus coupled to the first wedge member and the second wedge member, the adjustment apparatus for modifying a position of the second wedge member relative to the first wedge member to actuate movement of the unfixed IGV relative to the fixed IGV.

20 Claims, 4 Drawing Sheets

INLET GUIDE VANE ALIGNMENT APPARATUS AND METHOD

FIELD OF THE INVENTION

The subject matter disclosed herein relates to power systems. More particularly, the subject matter relates to turbine systems and associated alignment apparatuses.

BACKGROUND OF THE INVENTION

Conventional turbines, such as gas turbines, generally include three sections: a compressor section, a combustor section and a turbine section. In the compressor section, air is drawn in (e.g., from the surrounding atmosphere) and guided to the compressor using inlet guide vanes (also known as IGVs). IGVs are conventionally arranged circumferentially about the axis of the compressor section. These IGVs are conventionally aligned one at a time, using a protractor-like measurement device to determine the proper angle and spacing of each IGV as it is placed within the compressor adjacent its neighboring IGV. This device relies upon an angle measurement independent of the neighboring IGV. This process is similarly performed during both installation and maintenance of the IGVs, and can be time consuming, costly, and inaccurate.

BRIEF DESCRIPTION OF THE INVENTION

Various embodiments of the invention include alignment apparatuses and associated methods for use on a turbine (e.g., a gas turbine). In various particular embodiments, an apparatus for aligning an unfixed inlet guide vane (IGV) adjacent a fixed IGV in a gas turbine is disclosed. In some cases the apparatus includes: a first wedge member for interfacing with the fixed IGV; a second wedge member movably coupled with the first wedge member, the second wedge member for interfacing with the unfixed IGV; and an adjustment apparatus coupled to the first wedge member and the second wedge member, the adjustment apparatus for modifying a position of the second wedge member relative to the first wedge member to actuate movement of the unfixed IGV relative to the fixed IGV.

A first aspect of the invention includes an apparatus for aligning an unfixed inlet guide vane (IGV) adjacent a fixed IGV in a gas turbine, the apparatus including: a first wedge member for interfacing with the fixed IGV; a second wedge member movably coupled with the first wedge member, the second wedge member for interfacing with the unfixed IGV; and an adjustment apparatus coupled to the first wedge member and the second wedge member, the adjustment apparatus for modifying a position of the second wedge member relative to the first wedge member to actuate movement of the unfixed IGV relative to the fixed IGV.

A second aspect of the invention includes an apparatus having: a first wedge member shaped to interface with a fixed IGV in a gas turbine; a second wedge member movably coupled with the first wedge member, the second wedge member shaped to interface with an unfixed IGV in the gas turbine; and an adjustment apparatus coupled to the first wedge member and the second wedge member, the adjustment apparatus for modifying a position of the second wedge member relative to the first wedge member to actuate movement of the unfixed IGV relative to the fixed IGV in the gas turbine.

A third aspect of the invention includes a method of aligning an unfixed inlet guide vane (IGV) adjacent a fixed IGV in a gas turbine, the method including: placing an alignment apparatus in contact with the fixed IGV and the unfixed IGV, the alignment apparatus including: a first wedge member shaped to interface with the fixed IGV; a second wedge member movably coupled with the first wedge member, the second wedge member shaped to interface with the unfixed IGV; and an adjustment apparatus coupled to the first wedge member and the second wedge member; and actuating the adjustment apparatus to modify a position of the second wedge member relative to the first wedge member, the actuating causing the unfixed IGV to move relative to the fixed IGV.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
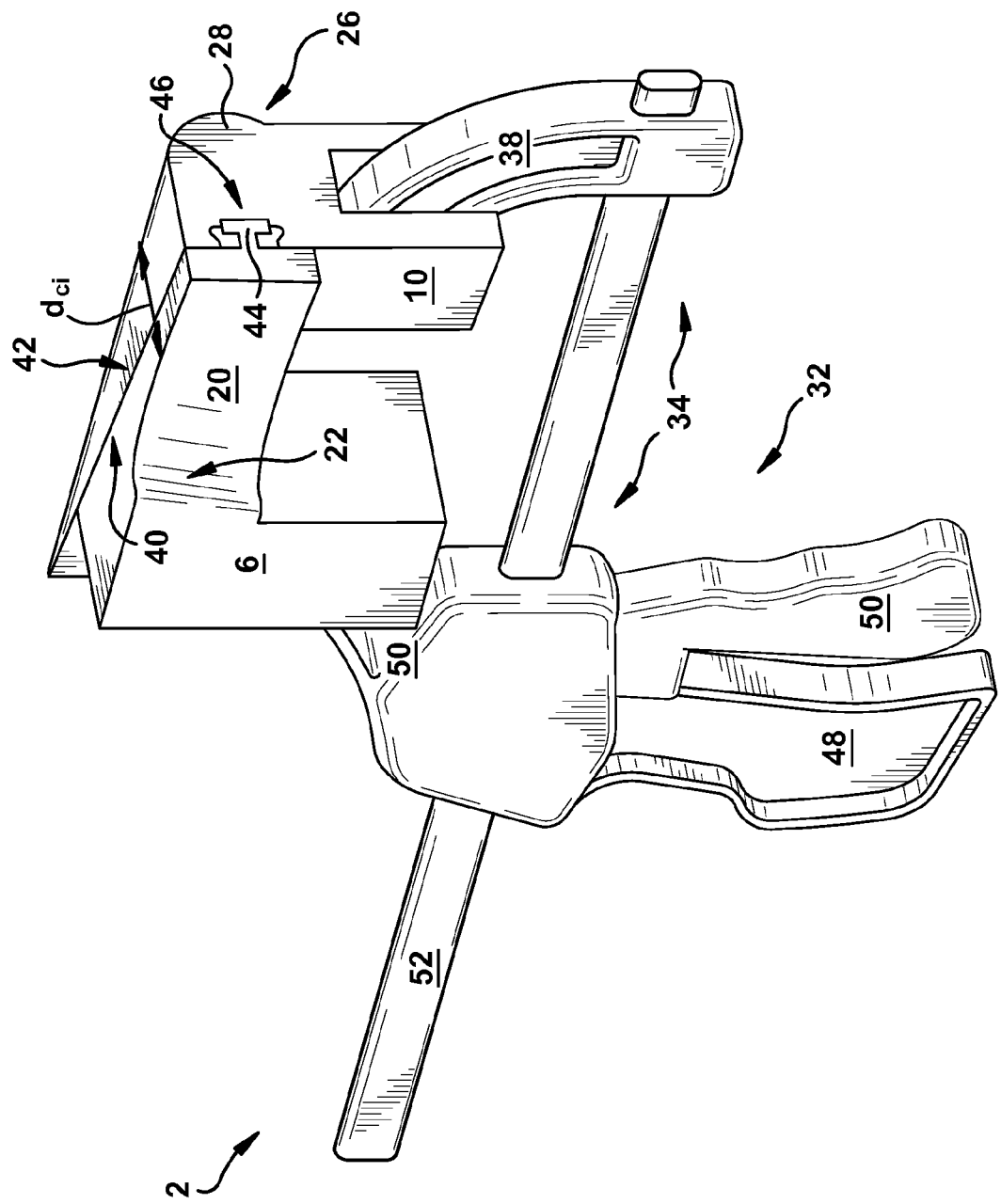
FIG. 1 shows a schematic perspective view of an apparatus according to various embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As noted, the subject matter disclosed herein relates to power systems. More particularly, the subject matter relates to turbine systems (e.g., gas turbines) and associated alignment apparatuses.

As described herein, conventional turbines, such as gas turbines, generally include three sections: a compressor section, a combustor section and a turbine section. In the compressor section, air is drawn in (e.g., from the surrounding atmosphere) and guided to the compressor using inlet guide vanes (also known as IGVs). IGVs are conventionally arranged circumferentially about the axis of the compressor section. These IGVs are conventionally aligned one at a time, using a protractor-like measurement device to determine the proper angle and spacing of each IGV as it is placed within the compressor adjacent its neighboring IGV. This device relies upon an angle measurement independent of the neighboring IGV. This process is similarly performed during both installation and maintenance of the IGVs, and can be time consuming, costly, and inaccurate.

In contrast to the conventional approaches, various embodiments of the invention include an alignment apparatus and associated method which increases the accuracy of alignment of the IGVs, and reduces the time spent in aligning those IGVs. The alignment apparatus can be shaped to interface with a fixed IGV and an unfixed IGV to align the unfixed IGV with the fixed IGV. In various embodiments, the alignment apparatus employs opposing wedge members (or wedge blocks) which allow for efficient modification of the position of the unfixed IGV relative to the fixed IGV.

In various particular embodiments, an apparatus for aligning an unfixed inlet guide vane (IGV) adjacent a fixed IGV in a gas turbine is disclosed. In these cases, the apparatus can include: a first wedge member for interfacing with the fixed IGV; a second wedge member movably coupled with the first wedge member, the second wedge member for interfacing with the unfixed IGV; and an adjustment apparatus coupled to the first wedge member and the second wedge member, the adjustment apparatus for modifying a position of the first wedge member relative to the second wedge member to actuate movement of the unfixed IGV relative to the fixed IGV.

Various particular aspects of the invention include an apparatus. The apparatus can include: a first wedge member shaped to interface with a fixed IGV in a gas turbine; a second wedge member movably coupled with the first wedge member, the second wedge member shaped to interface with an unfixed IGV in the gas turbine; and an adjustment apparatus coupled to the first wedge member and the second wedge member, the adjustment apparatus for modifying a position of the first wedge member relative to the second wedge member to actuate movement of the unfixed IGV relative to the fixed IGV in the gas turbine.

Other particular aspects of the invention include a method of aligning an unfixed inlet guide vane (IGV) adjacent a fixed IGV in a gas turbine. The method can include: placing an alignment apparatus in contact with the fixed IGV and the unfixed IGV, the alignment apparatus including: a first wedge member shaped to interface with the fixed IGV; a second wedge member movably coupled with the first wedge member, the second wedge member shaped to interface with the unfixed IGV; and an adjustment apparatus coupled to the first wedge member and the second wedge member; and actuating the adjustment apparatus to modify a position of the first wedge member relative to the second wedge member, the actuating causing the unfixed IGV to move relative to the fixed IGV.

Figure 2:
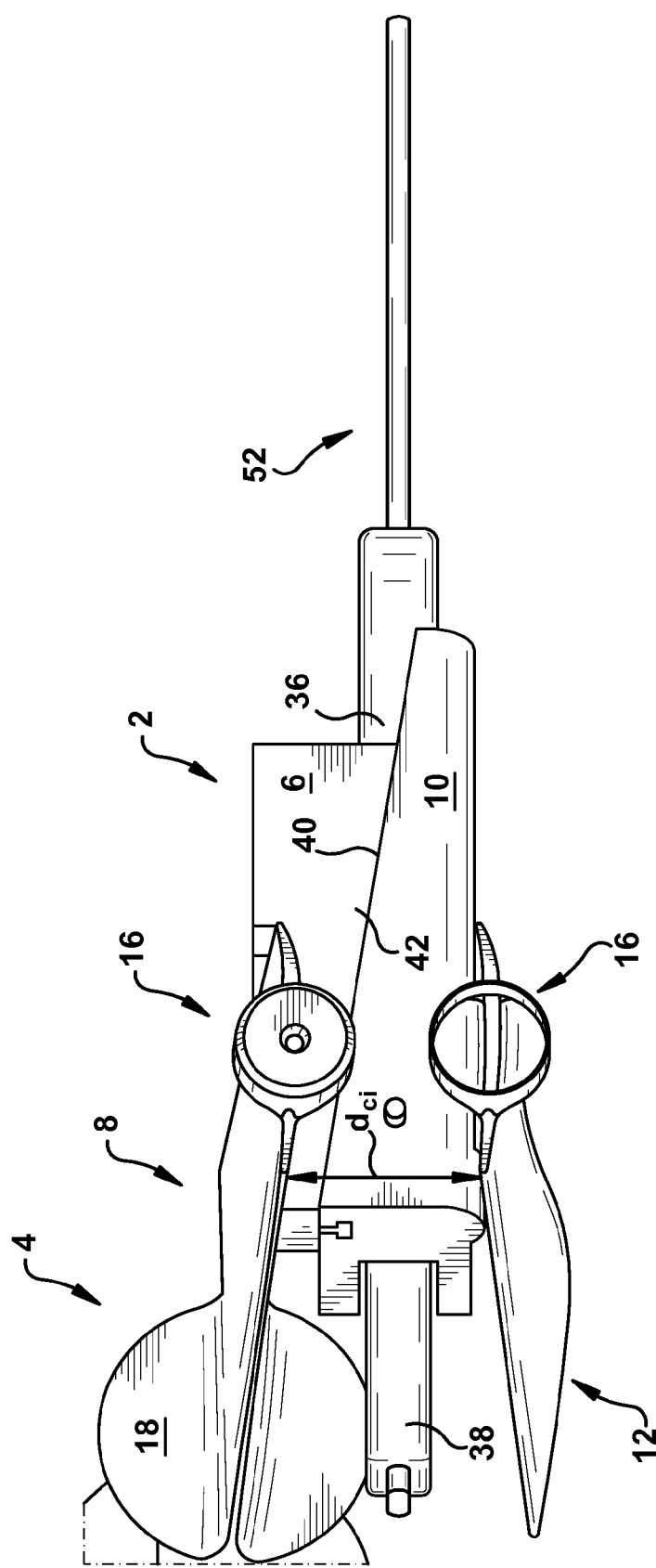
FIG. 2 shows a schematic top view of the apparatus of FIG. 1, interacting with components of a turbine according to various embodiments of the invention.
Figure 3:
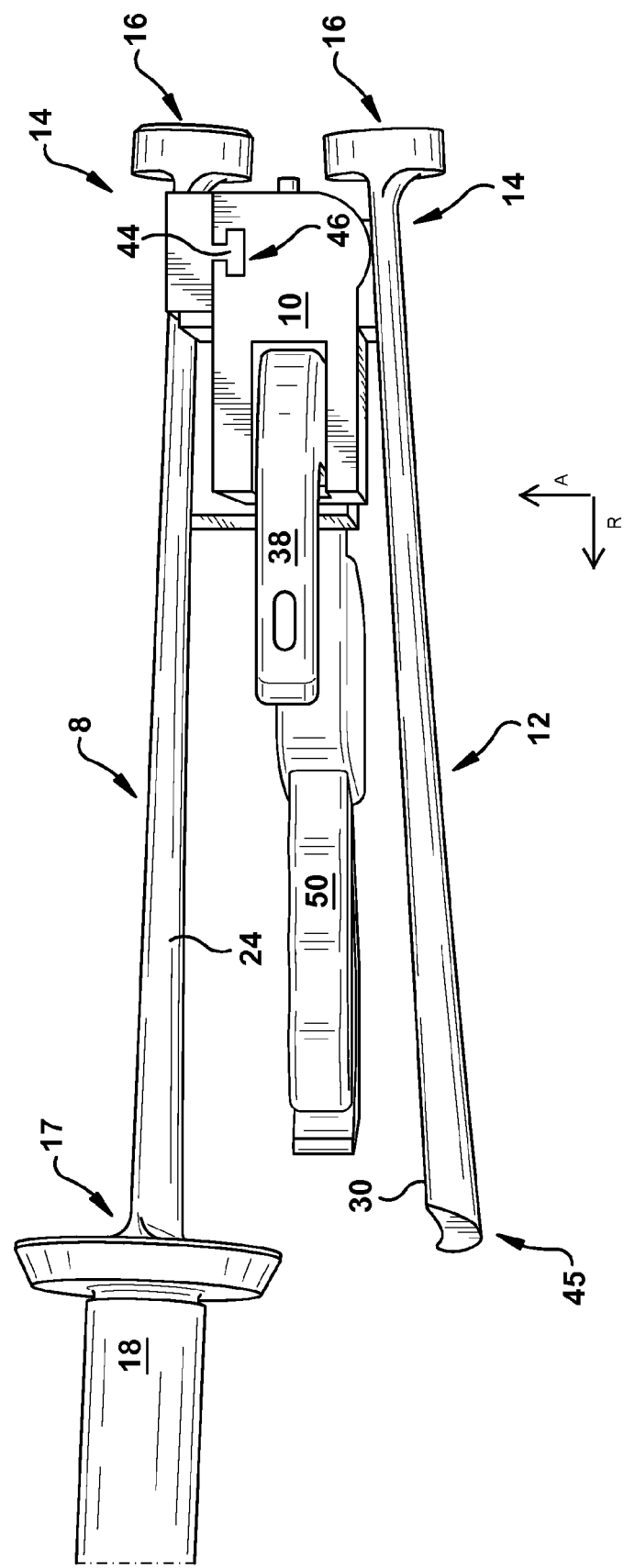
FIG. 3 shows a side view of the depiction of the apparatus and turbine of FIG. 2 according to various embodiments of the invention.

Turning to FIG. 1, a schematic view of an apparatus 2 is shown according to various embodiments of the invention. As shown, the apparatus 2 is designed for aligning an unfixed inlet guide vane (IGV) (FIG. 2) adjacent a fixed IGV (FIG. 2) in a gas turbine (FIG. 2). FIG. 2 shows a top perspective view of the apparatus 2 located between IGVs in a portion of a gas turbine 4 (e.g., a gas turbine compressor). FIG. 3 shows a perspective end view of the apparatus 2 and the IGVs in the portion of the gas turbine 4 as shown in FIG. 2.

For purposes of clarity, reference is made to FIGS. 1-3 in describing the various embodiments of the invention. Turning to FIGS. 1-2, with particular reference to FIG. 1, the apparatus 2 can include a first wedge member 6 for interfacing with a fixed IGV 8 in the gas turbine 4 (FIGS. 2-3). The apparatus 2 can further include a second wedge member 10 movably coupled with the first wedge member 6, where the second wedge member 10 is configured for interfacing with an unfixed IGV 12 in the gas turbine 4.

As shown in FIG. 3, the fixed IGV 8 includes proximate a first end 14, a first rotatable coupler 16, which sits within a radially inner ring of the gas turbine 4 (ring not shown). The first rotatable coupler 16 is configured to rotate about a radial axis (R) which is perpendicular to the axis of rotation (A) of the gas turbine 4 (e.g., the gas turbine compressor). That is, when an IGV is coupled to the first rotatable coupler 16, that IGV is restricted from movement except in terms of rotation about the radial axis (R). The IGV (e.g., the fixed IGV 8) can be integrally coupled (e.g., cast together with or welded to) the first rotatable coupler 16. The IGV (e.g., the fixed IGV 8) is also coupled at a second end 17 with a second (rotationally fixed) coupler 18 (e.g., via integral casting or welding). In this depiction, the second coupler 18 restricts movement of the fixed IGV 8 about the radial axis (R), because second coupler 18 is locked into a slot (not shown). That is, the second coupler 18 (when locked) prevents movement of the fixed IGV 8, which as its name denotes, remains fixed in place in the gas turbine 4. The unfixed IGV 12, which is shown as separated from a second coupler, is free to rotate about axis (R). It is understood that the unfixed IGV 12 can be coupled to a second coupler, e.g., a coupler similar to second coupler 18, but that unfixed IGV 12 is not rotationally fixed during the process of adjustment described herein. A second coupler joined with the unfixed IGV 12 can later be fixed (e.g., via engaging the coupler with a lock) after reaching its desired position.

In various embodiments of the invention, the IGV can be initially placed in the gas turbine 4 and coupled to the first rotatable coupler 16. Following placement of the IGV, an operator can measure the angle of the IGV (e.g., using a protractor or other similar device) and adjust its position about the axis (R) until it reaches a desirable position/angle. After the IGV reaches its desired position, the operator may fix the IGV (e.g., via locking of the second coupler 18), thereby forming what is referred to herein as the fixed IGV 8.

Returning to FIG. 1, in various embodiments of the invention, the first wedge member 6 includes a first contact surface 20 having a notch (also termed a groove) 22 for contacting the fixed IGV 8. In particular, the first wedge member 6 can include a first contact surface 20 (e.g., including notch 22) which is shaped to contact a convex side 24 (FIG. 3) of the fixed IGV 8. The notch 22 can be sized to fit flush (without substantial separation) with the convex side 24 of the fixed IGV 8.

The second wedge member 10 can include a second contact surface 26 (FIGS. 1-3) having a protrusion 28 for contacting the unfixed IGV 12. In some cases, the protrusion 28 is a rounded or bulbous protrusion which extends from the second contact surface 26. In various embodiments, the second contact surface 26 (including the protrusion 28) is shaped to contact a concave side 30 of the unfixed IGV 12. In some embodiments, the second contact surface 26 is configured to contact the concave side 30 (FIG. 3) of the unfixed IGV 12 only at the protrusion 28 (e.g., at two points on the protrusion 28).

As shown in FIG. 1, the apparatus 2 can further include an adjustment apparatus 32 coupled to the first wedge member 6 and the second wedge member 10. In some cases, the adjustment apparatus 32 can include a clamp 34 having a first clamp arm 36 coupled to the first wedge member 6, and a second clamp arm 38 coupled to the second wedge member 10. The clamp arms 36, 38 can be coupled to the respective wedge members 6, 10 by any conventional means, e.g., via a pin, fastener, fitted prong/slot, etc. As described herein, the adjustment apparatus 32 can be configured to modify a position of the second wedge member 10 relative to the first wedge member 6 to actuate movement of the unfixed IGV 12 relative to the fixed IGV 8. In some cases, the first clamp arm 36 is configured to remain fixed, and the second clamp 38 is movable relative to the first clamp arm 36. This allows for movement of the second wedge member 10 relative to the first wedge member 6 during operation of the adjustment apparatus 32.

It is understood, however, that in various alternative embodiments, the adjustment apparatus 32 need not necessarily include a clamp 34 as shown. The adjustment apparatus 32 can include any mechanism capable of initiating movement of the first wedge member 6 relative to the second wedge member 10, e.g., a pneumatic, hydraulic, electrical and/or mechanical actuation mechanism which initiates movement of the first wedge member 6 relative to the second wedge member 10.

As can be seen in FIGS. 1-2, the first wedge member 6 and the second wedge member 10 can be movably coupled at substantially complementary surfaces 40, 42, respectively. That is, the first wedge member 6 can include a first angled (or sloped) surface 40 which complements a substantially oppositely angled (or sloped) surface 42 of the second wedge member 10. The first angled surface 40 can be coupled to the second angled surface 42 via any conventionally movable means, e.g., via a sliding rail or other similar system. In some particular cases, the first wedge member 6 includes a key member 44 and the second wedge member 10 includes a slot 46 for receiving the key member 44. As the second wedge member 10 moves relative to the first wedge member 6, the key member 44 can slide within the slot 46, which can extend, e.g., a portion of the length of the second angled surface 42.

In some cases, as shown in FIG. 1, the adjustment apparatus 32 can further include an actuatable handle 48 for initiating the modification of the position of the first wedge member 6 relative to the second wedge member 10. The handle 48 can include a trigger mechanism 50, which is coupled to a sliding arm 52 (fixedly coupled to the second clamp arm 38). In some cases, actuating the handle 48, e.g., by compressing its trigger mechanism 50 draws the sliding arm 52 (and the second clamp arm 38) toward the first clamp arm 36.

As best seen in FIGS. 1-2, the first wedge member 6 and the second wedge member 10 collectively define a circumferential distance (along the circumference (c) of the turbine 4) $d_{ei}$ between the unfixed IGV 12 and the fixed IGV 8. In various embodiments, the adjustment apparatus 32 is configured to modify the circumferential distance $d_{ei}$ between the unfixed IGV 12 and the fixed IGV 8 by modifying the position of the second wedge member 10 relative to the first wedge member 6. In some cases, the adjustment apparatus 32 can expand or contract the $d_{ei}$ by moving the second wedge member 10 relative to the first wedge member 6.

In some cases, as illustrated in FIG. 3, after actuating the adjustment apparatus 32 to align the unfixed IGV 12 as desired, an operator can fix the unfixed IGV 12, e.g., by locking the unfixed IGV 12 (e.g., via a second coupler 18) affixing the free end 45 of the IGV to a rotationally fixed coupler 18 (similarly described herein) to fix the unfixed IGV 12 and form a second fixed IGV. This process can be repeated for a series of circumferentially (e.g., along the (c) direction) adjacent IGVs, where a fixed IGV is used as a reference point for the apparatus 2 to align an adjacent, unfixed IGV. Proceeding around the circumference of the inlet of the turbine 4, an operator can use the adjustment apparatus 32 to successively align adjacent IGVs to complete alignment for a set of IGVs in a more efficient and accurate manner than the current approaches for aligning IGVs.

Figure 4:
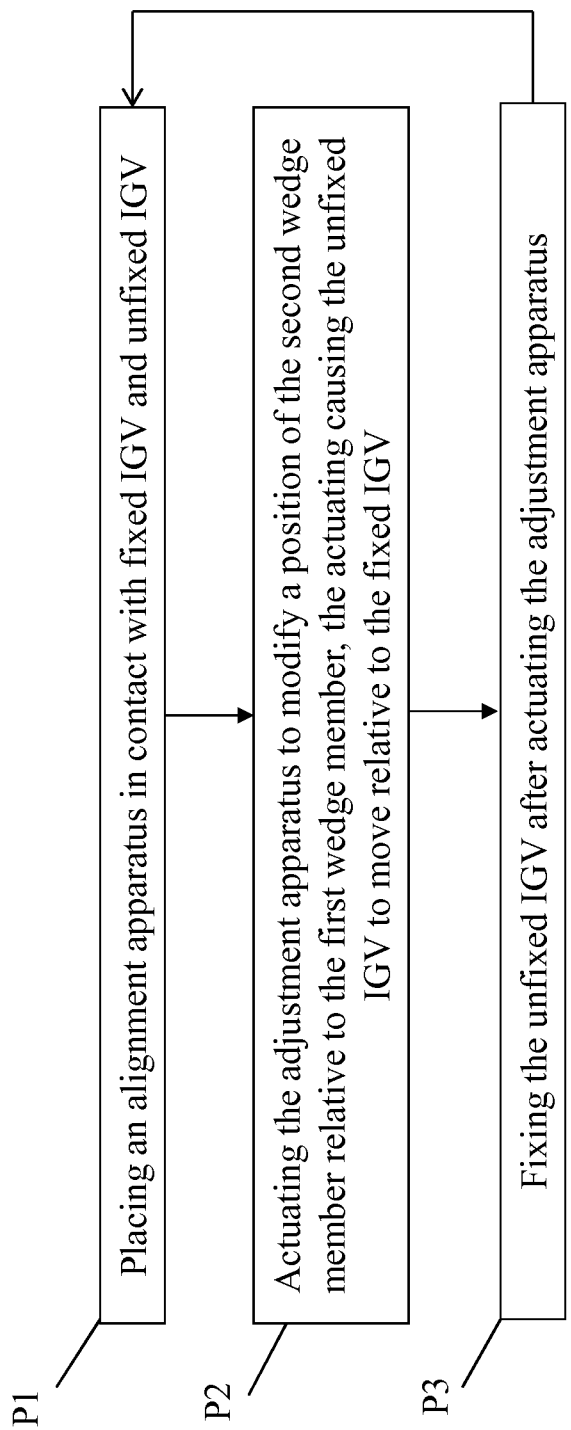
FIG. 4 shows a schematic flow diagram illustrating processes in a method according to various embodiments of the invention.

FIG. 4 shows a process flow diagram illustrating a method according to various embodiments of the invention. As shown, the method can include:

Process P1: Placing an alignment apparatus (e.g., apparatus 2) in contact with a fixed IGV (e.g., fixed IGV 8) and an unfixed IGV (e.g., unfixed IGV 12). In various embodiments, the alignment apparatus can include: a first wedge member (e.g., first wedge member 6) shaped to interface with the fixed IGV, a second wedge member (e.g., second wedge member 10) movably coupled with the first wedge member, where the second wedge member is shaped to interface with the unfixed IGV, and an adjustment apparatus (e.g., adjustment apparatus 2) coupled to the first wedge member and the second wedge member;

Process P2: Actuating the adjustment apparatus to modify a position of the second wedge member relative to the first wedge member, where the actuating causes the unfixed IGV to move relative to the fixed IGV; and Process P3: Fixing the unfixed IGV after actuating of the adjustment apparatus.

FIG. 4 illustrates that processes P1-P3 can be repeated for a subsequent unfixed IGV adjacent to the fixed IGV (e.g., that IGV fixed in process P3). This process can be repeated for a series of adjacent IGVs in a turbine system (e.g., a gas turbine compressor).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It is further understood that the terms "front" and "back" are not intended to be limiting and are intended to be interchangeable where appropriate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An apparatus for aligning an unfixed inlet guide vane (IGV) adjacent a fixed IGV in a gas turbine, the apparatus comprising:
    a first wedge member for interfacing with the fixed IGV, wherein the first wedge member includes a first contact surface having a notch for contacting the fixed IGV, wherein the notch is sized to fit flush with a convex side of the fixed IGV;
    a second wedge member movably coupled with the first wedge member, the second wedge member for interfacing with the unfixed IGV, wherein the second wedge member includes a second contact surface having a protrusion for contacting the unfixed IGV; and
    an adjustment apparatus coupled to the first wedge member and the second wedge member, the adjustment apparatus for modifying a position of the second wedge member relative to the first wedge member to actuate movement of the unfixed IGV relative to the fixed IGV.

2. The apparatus of claim 1, wherein the first wedge member and the second wedge member are movably coupled at substantially complementary surfaces.

3. The apparatus of claim 1, wherein the first wedge member and the second wedge member collectively define a circumferential distance between the unfixed IGV 4. The apparatus of claim 3, wherein the adjustment apparatus is configured to modify the circumferential distance between the unfixed IGV and the fixed IGV by modifying the position of the second wedge member relative to the first wedge member, wherein the adjustment apparatus includes a clamp having a first clamp arm coupled to the first wedge member and a second clamp arm couple to the second wedge member, wherein the first clamp arm is configured to remain fixed and the second clamp arm is movable relative to the first clamp arm.

5. The apparatus of claim 1, wherein the first wedge member includes a first angled surface, and the second wedge member includes a second angled surface that substantially complements the first angled surface of the first wedge member.

6. The apparatus of claim 1, wherein the first contact surface is shaped to contact a convex side of the fixed IGV, and wherein the second contact surface is shaped to contact a concave side of the unfixed IGV.

7. The apparatus of claim 1, wherein the adjustment apparatus includes an actuatable handle for initiating the modification of the position of the first wedge member relative to the second wedge member, wherein the actuatable handle includes a trigger mechanism coupled to a sliding arm, wherein the adjustment apparatus includes a clamp having a first clamp arm coupled to the first wedge member and a second clamp arm coupled to the second wedge member, the sliding arm fixedly coupled to the second clamp arm, wherein compressing the trigger mechanism draws the sliding arm and the second clamp arm toward the first clamp arm.

8. The apparatus of claim 1, wherein the adjustment apparatus includes a clamp having a first clamp arm coupled to the first wedge member and a second clamp arm couple to the second wedge member.

9. The apparatus of claim 8, wherein the first clamp arm is configured to remain fixed and the second clamp arm is movable relative to the first clamp arm.

10. The apparatus of claim 1, wherein the first wedge member includes a key member and the second wedge member includes a slot for receiving the key member.

11. An apparatus comprising:
a first wedge member shaped to interface with a fixed IGV in a gas turbine;
a second wedge member movably coupled with the first wedge member, the second wedge member shaped to interface with an unfixed IGV in the gas turbine; and
an adjustment apparatus coupled to the first wedge member and the second wedge member, the adjustment apparatus for modifying a position of the second wedge member relative to the first wedge member to actuate movement of the unfixed IGV relative to the fixed IGV in the gas turbine,
wherein the adjustment apparatus includes a clamp having a first clamp arm coupled to the first wedge member and a second clamp arm coupled to the second wedge member,
wherein the first clamp arm is configured to remain fixed and the second clamp arm is movable relative to the first clamp arm.

12. The apparatus of claim 11, wherein the first wedge member and the second wedge member are movably coupled at substantially complementary surfaces.

13. The apparatus of claim 11, wherein the first wedge member and the second wedge member collectively define a circumferential distance between the unfixed IGV and the fixed IGV in the gas turbine.

14. The apparatus of claim 13, wherein the adjustment apparatus is configured to modify the circumferential distance between the unfixed IGV and the fixed IGV by modifying the position of the second wedge member relative to the first wedge member.

15. The apparatus of claim 11, wherein the first wedge member includes a first angled surface, and the second wedge member includes a second angled surface that substantially complements the first angled surface of the first wedge member, wherein the first wedge member includes a first contact surface having a notch for contacting the fixed IGV, wherein the notch is sized to fit flush with a convex side of the fixed IGV, wherein the second wedge member includes a second contact surface having a protrusion for contacting the unfixed IGV, and wherein the first contact surface is shaped to contact a convex side of the fixed IGV, and wherein the second contact surface is shaped to contact a concave side of the unfixed IGV.

16. A method of aligning an unfixed inlet guide vane (IGV) adjacent a fixed IGV in a gas turbine, the method comprising:
placing an alignment apparatus in contact with the fixed IGV and the unfixed IGV, the alignment apparatus including:
a first wedge member shaped to interface with the fixed IGV;
a second wedge member movably coupled with the first wedge member, the second wedge member shaped to interface with the unfixed IGV; and
an adjustment apparatus coupled to the first wedge member and the second wedge member; and
actuating the adjustment apparatus to modify a position of the second wedge member relative to the first wedge member, the actuating causing the unfixed IGV to move relative to the fixed IGV.

17. The method of claim 16, further comprising fixing the unfixed IGV after the actuating of the adjustment apparatus.

18. The apparatus of claim 1, wherein the second contact surface is shaped to contact a concave side of the unfixed IGV only at the protrusion.

19. The apparatus of claim 18, wherein the protrusion includes a rounded or bulbous protrusion extending from the second contact surface.

20. The apparatus of claim 11, wherein the adjustment apparatus includes an actuatable handle for initiating the modification of the position of the first wedge member relative to the second wedge member, wherein the actuatable handle includes a trigger mechanism coupled to a sliding arm, wherein the adjustment apparatus includes a clamp having a first clamp arm coupled to the first wedge member and a second clamp arm coupled to the second wedge member, the sliding arm fixedly coupled to the second clamp arm, wherein compressing the trigger mechanism draws the sliding arm and the second clamp arm toward the first clamp arm.

* * * * *

UNITED STATES PATENT AND TRADEMARK OFFICE
CERTIFICATE OF CORRECTION

PATENT NO.       : 8,978,262 B2                                      Page 1 of 1
APPLICATION NO.  : 13/689269
DATED            : March 17, 2015
INVENTOR(S)      : Spanos et al.

It is certified that error appears in the above-identified patent and that said Letters Patent is hereby corrected as shown below:

In the specification

In Column 5, Line 33, delete "$d_{ei}$" and insert -- $d_{ci}$ --, therefor.

In Column 5, Line 36, delete "$d_{ei}$" and insert -- $d_{ci}$ --, therefor.

In Column 5, Line 40, delete "$d_{ei}$" and insert -- $d_{ci}$ --, therefor.

In the claims

In Column 6, Line 65, in Claim 3, delete "IGV" and insert -- IGV and the fixed IGV. --, therefor.

Signed and Sealed this
Twenty-fourth Day of November, 2015

Michelle K. Lee
*Director of the United States Patent and Trademark Office*